Aug. 23, 1949.  R. D. GECKLER  2,479,828
PROPELLANT CHARGE FOR ROCKET MOTORS
Filed Nov. 20, 1947
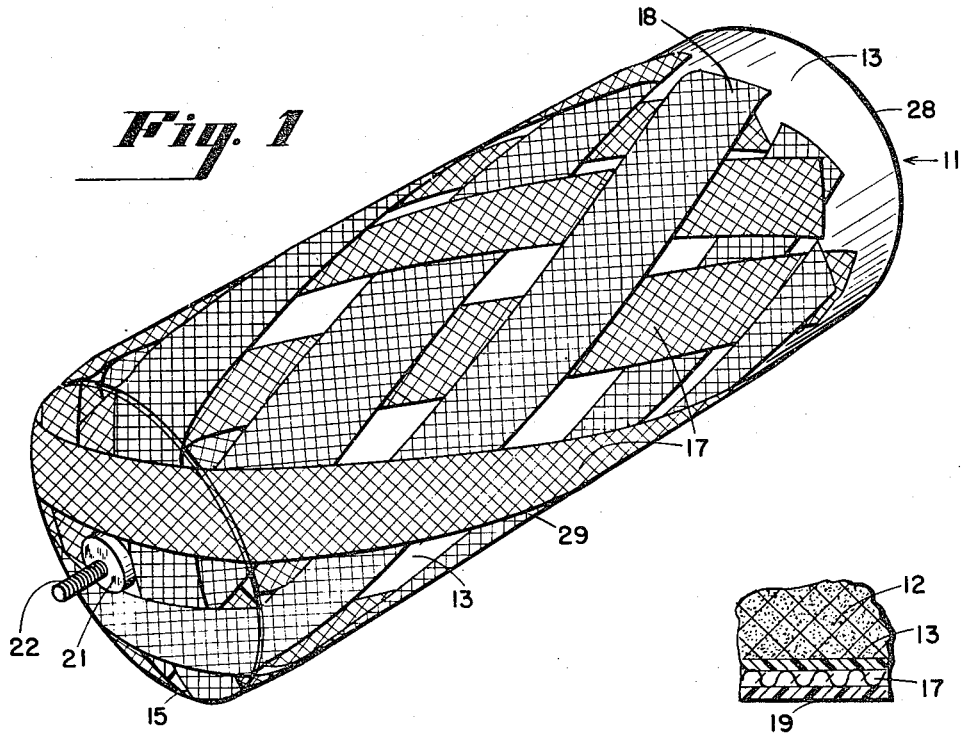
Fig. 1
Fig. 2
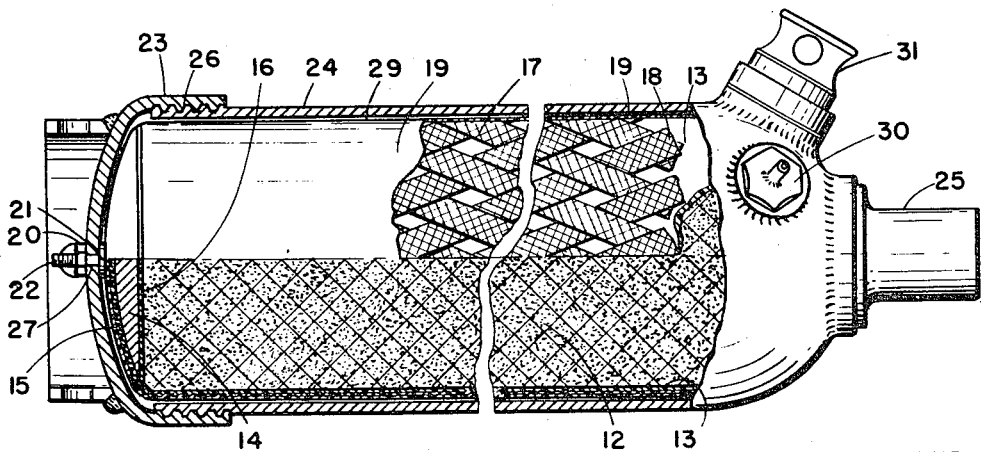
Fig. 3
INVENTOR.
RICHARD D. GECKLER
BY
ATTORNEYS Patented Aug. 23, 1949

2,479,828

UNITED STATES PATENT OFFICE 2,479,828

PROPELLANT CHARGE FOR ROCKET MOTORS

Richard D. Geckler, Pasadena, Calif., assignor to Aerojet Engineering Corporation, Azusa, Calif., a corporation of Delaware Application November 20, 1947, Serial No. 787,189

10 Claims. (Cl. 102—98)

This invention relates to jet propulsion and has for its object to improve the burning properties of solid propellant charges.

A related object is to provide an improved means for supporting propellant grains within the combustion chamber of a rocket motor in such a manner that they may be subjected to considerable stress without cracking or becoming loose within the motor chamber.

A rocket motor commonly comprises a combustion chamber having an exhaust nozzle and a combustible charge placed within the chamber. Upon burning, the charge produces large volumes of gas under high pressure which are exhausted from the chamber through the nozzle at high velocity; and the reaction resulting from the flow of gas masses through the nozzle creates the propulsive thrust. For satisfactory operation it is required that the burning rate of the propellant charge remains substantially constant throughout the operation since fluctuations in the burning rate may cause drastic changes in pressure within the chamber, which if severe enough may result in its destruction.

A practice used heretofore has been to support a solid propellant charge within the combustion chamber of a rocket motor by a plate fastened to the forward end of the charge and supported against the motor chamber. Such a supporting means for a propellant charge is disclosed in the copending application of Crutchfield Serial No. 596,208, filed May 28, 1945.

When the motor or charge is subjected to unusually severe shock or stress, however, a mounting of the foregoing may not always hold the charge secure against pulling away from its support. If the charge does tend to pull away from its support it is in danger of fracturing. This involves the disadvantage of increasing the burning area of the charge and hence its burning rate, with consequent undesirable increase of gas pressure within the motor chamber. Furthermore, if a portion of the fractured charge should break away it may be forced into the exhaust nozzle and prevent the proper egress of gas, thereby causing an explosion.

By use of my invention, I minimize the danger of the charge becoming broken or detached from its support. I carry out my invention by treating the propellant charge or grain in the following manner: The solid propellant charge or grain will ordinarily be shaped to conform in size and shape with the rocket motor chamber; and when the rocket motor chamber is in the usual cylindrical shape, the propellant charge will likewise ordinarily be cylindrical to fit nicely within the chamber. A common way of forming the propellant charge or grain is to cast it from a molten condition in a mold and to allow it to solidify upon cooling. After the solidifying, and a usual aging procedure which may involve setting it and curing it according to well known procedures, I prefer to coat the charge on all of its surfaces except the burning surface, with a suitable layer of a so-called restricting material, the function of which is to adhere closely to the walls of the charge and to prevent burning along the walls so that the burning of the charge takes place on the uncoated end surface. The use of such restrictive liners is known in the art and requires no detailed explanation here.

A suitable kind of restricting liner material may for example be a thermoplastic material such as asphalt, or a thermoplastic resin, or a combination of thermoplastic resins. These are applicable to such forms of propellant charges as an asphalt base propellant having mixed with it a sufficient quantity of inorganic oxidizer to maintain combustion, or a thermosetting alkyd resin having incorporated with it the oxidizer. The nature and use of such restricting liners are described in greater detail in the Crutchfield application Serial No. 596,208, and the Hirsch et al. application Serial No. 782,608, filed October 28, 1947, entitled "Rocket propellant charge and liner therefor." Regardless of what particular restrictive liner material is used, it should be a substance which readily bonds to the surface of the propellant charge.

A suitable way of applying the restrictive liner is to heat the liner material until it is liquid and thus apply it in molten form on the surface of the propellant grain until a restrictive layer of sufficient thickness has been formed. It may then be allowed to cool and solidify.

Following the foregoing sequence, I apply a plate, preferably of a lightweight metal such as aluminum having a surface adapted to be applied against the end surface of the propellant charge which is opposite the burning surface; and preferably the other surface of the plate may be shaped to conform somewhat with the outline of the forward end of the rocket motor chamber.

According to a feature, a fastening such as a stud is attached to the plate for holding it at a forward position of the motor chamber. To hold the charge to the plate, I provide strips of tape or the like extending along the sides of the charge and across the back of the plate and adhering to the charge. A preferred form of tape is one having a high tensile strength, such as a metal cloth tape or a glass cloth tape.

Preferably the tape strips extend along the major length of the side of the grain. According to another preferred feature, they pass over the end plate and extend along the cylindrical side of the cylinder in the form of a gradual spiral, the spirals of the several tapes overlapping each other. According to this feature, the sides of the propellant grain are substantially enclosed by the tape wrapping, although it is not essential that the entire surface of the grain be covered by the tape.

Following the application of the tape I prefer to apply to the taped charge a second coating of lining material; and this may conveniently be applied in the same way as the first coat, that is, by applying it in a molten condition and allowing it to cool and solidify. In this way, the tape wrappings become impregnated with the lining material and are made firmly adherent to the charge. The thickness of this second liner layer may be increased to any desired amount and preferably it is made thick enough to embed the tape material beneath a substantial thickness of liner material.

An advantage of the foregoing construction is that the plurality of tapes aggregates to a high degree of strength suitable for resisting considerable abrasion and shock without allowing fracturing or breaking of the propellant charge.

Another advantage is that the support of the propellant charge is not dependent upon the adhesive properties of the sticky material of the tape which adheres to the surfaces of the plate and the propellant grain.

The foregoing and other features of my invention will be better understood from the following detailed description taken in conjunction with the accompanying drawings in which:

Fig. 1 is an isometric view of a propellant grain mounted on an end plate and wrapped with tape, in accordance with my invention;

Fig. 2 is an enlarged view in cross section of a part of the charge of Fig. 1, showing restrictive liners in relation to the tapes; and Fig. 3 is a view partly in cross section showing a propellant charge according to my invention installed in a rocket motor.

Referring to the drawings, Fig. 1 shows a cast and cured propellant charge, or grain, as it is usually called in the form of a solid cylinder or stick 11. This is a form suitable for use in a cylindrical-shaped rocket motor chamber. This may be composed of a suitable propellant material 12 containing its own oxidizer. Examples of a suitable kind of charge are: asphalt having mixed within it a sufficient quantity of ground inorganic perchlorate to maintain combustion; or a thermosetting alkyd resin having incorporated within it a sufficient quantity of ground inorganic perchlorate to support its combustion. The propellant grain may be formed in some suitable manner, for example, by heating the substance sufficient to liquefy it, from which condition it may be cast and solidified, or cast and cured depending upon the nature of the plastic material used to form the matrix.

Such a stick is generally cast longer in length than the finished charge to permit trimming it down to size when the finished cartridge is ready for insertion in the motor. After the stick has been cast, solidified and aged, or cast and cured, I then coat the wall of the solid stick with a suitable liner 13 made of thermoplastic material. This coating is applied to the cylindrical wall and the forward end wall, but not to the rear end, which is the burning end. For this purpose such materials as asphalt, thermoplastic resin or thermoplastic resin mixtures having slower burning properties than the grain itself, may be used, depending upon the nature of the propellant charge. The coating may be either applied by spraying, dipping, or painting, though in cases where the matrix of the propellant is a thermosetting alkyd resin the preferred method is to dip the stock in a bath of a compatible thermoplastic resin or mixture of resins. After its application, the liner is permitted to cool to ambient temperature and when it is solidified a metal plate 14, preferably provided with a curved surface 15, to conform to the outline of the inner side of the forward end of the motor chamber, is placed with its flat surface 16 in contact with the coated end of the grain 11.

The central portion of the metal plate 14 is provided with a centrally positioned cylindrical metal projection 21 provided with a stud 22. This stud permits attachment of the metal plate securely to the cap 23 covering the forward end of the cylindrical motor chamber as shown in Fig. 3.

To fasten the propellant stick to the plate, I make use of a considerable number of lengths of tape 17. I pass the central portions of each of these lengths of tape over the metal end plate 14, and carry both ends of each tape length for a substantial distance 18 up the sides of the stick. The tapes are arranged so that the sides of the coated propellant cylinder are spirally wrapped with the extending tape ends; and the several tapes overlap each other and are preferably interleaved to form a woven retainer, as shown in Fig. 1. The tapes are preferably of glass cloth or metal cloth, these being materials furnishing high tensile strength.

The wrapped propellant grain and metal end piece are then coated or dipped again in the thermoplastic resin bath and a second layer 19 of sufficient thickness is permitted to form over the surface of the tape wrappings. The resinous material is permitted to fill the spaces between the filaments of the glass cloth tape or metal cloth tape until enough resin is deposited over the surface of the impregnated tape to embed the helical wrappings in a protective layer of desired thickness. The finished stick is then cut to the desired length depending on the length of the reaction chamber of the motor and may be stored in the open or in a container, or installed in the motor chamber as required.

Fig. 3 shows a rocket motor with a cylindrical combustion chamber 24 having an exhaust nozzle 25 at the rear end and closure cap 23 at the front end. The cap may be attached to the chamber by suitable means such as the threads 26. In assembling the charge in the motor, cap 23 may be removed and stud 22 inserted through a clearance hole 27 provided through the center of the closure cap 23 until the curved surface 15 of plate 14 rests against the inner portion of the forward motor closure cap 23. A nut 20 holds the stud securely in place. The charge thus attached to the cap is then introduced into the combustion chamber 24 and the cap is screwed on tightly. The element 31 is a safety cap which is provided according to common practice to release excessive pressures.

Since the propellant grain 11 is rigidly attached to the metal plate 14 by the tape 17 and liners 13 and 19 and the plate 14 is in turn secured to the forward cap of the motor by stud 22 and nut 26, the propellant grain is firmly supported within the chamber and cannot shift any appreciable amount even though it is dropped or jarred.

Any stress or strain to which the assembled motor may be subjected is uniformly distributed over the entire area of the propellant grain by the overlapping layers of glass cloth tape and metal cloth tape, effectively preventing the stresses or strains from cracking, breaking, or causing the grain to become loose either before or during the burning period.

The burning end 28 of the propellant charge may be ignited by some suitable ignition means such as a conventional ignitor 30 provided at a convenient position in the nozzle end of the motor chamber. When the ignitor is fired, sufficient heat and flame is generated to cause the uniform ignition of the uncoated burning end 28 of the propellant charge, producing gases in large quantities and at elevated pressure, which when exhausted through the nozzle 25 create thrust.

Due to the close adherence between the propellant grain surface and the restricting liners 13 and 19, which are made of slower burning material than the propellant in the grain, no burning of the charge occurs alongs the sides 29 of the propellant grain facing the walls of the combustion chamber 24. This results in producing a steady burning rate which continues uniformly the entire length of the propellant grain until the propellant charge has been consumed.

My invention reduces the likelihood of failures due to non-uniform burning caused by cracking, or fracturing, of the propellant charge, or any increase in the burning area of the propellant charge caused by ignition taking place between the surface of the outer propellant grain and the restricting liner.

Another advantage of my invention is that the propellant grain is supported solidly within the reaction chamber and any stresses that are applied to the rocket motor are immediately distributed uniformly over the entire surface of the grain thereby greatly minimizing the possibility of breaking the grain before or during operation when the grain becomes subjected to unforeseen stresses or strains of great magnitude.

I claim:

1. A propellant charge for a rocket motor comprising a solid grain of self-combustible propellant, a thermoplastic liner surrounding the sidewall and one end of said grain, a metal plate having one flat surface, said surface being in contact with the coated end of said propellant grain, tape strips passing over said metal plate and extending a substantial distance along the sides of said propellant grain, said extending strips of tape being wrapped spirally around the coated sides of the grain, and a second liner impregnating and embedding the tape wrappings.

2. A propellant charge for a rocket motor comprising a solid grain of self-combustible propellant, a thermoplastic liner surrounding the sidewall and one end of said grain, a metal plate having one flat surface, said flat surface being placed in contact with the coated end of said propellant grain, glass cloth tape strips passing over the other surface of said metal plate and extending a substantial distance along the sides of said propellant grain, said extending portions of glass cloth tape being wound spirally down the coated sides of the grain, and a second liner impregnating and embedding the tape wrappings.

3. A propellant charge for a rocket motor comprising a solid grain of self-combustible propellant, a thermoplastic liner surrounding the sidewall and one end of said grain, a metal plate having a surface positioned against the coated end of said propellant grain, strips of metal cloth tape passing over the other surface of said metal plate and extending a substantial distance along the sides of said propellant grain, said extending ends of metal cloth tape being wound spirally down the coated side of the grain, and a second liner impregnating and embedding the tape wrappings.

4. A propellant charge for a rocket motor comprising a solid grain of self-combustible propellant, a thermoplastic liner surrounding one end and the sidewalls of said grain, a metal plate having one flat surface placed in contact with the coated end of said grain, the opposite surface of said metal plate being provided with a centrally positioned stud, tape strips passing over the surface of said metal plate and extending a substantial distance along the sides of said propellant grain, said extending strips of tape being wound spirally over the coated sides of the grain, and a second liner impregnating and embedding the tape wrappings.

5. A propellant charge for a rocket motor having a firing chamber and an exhaust nozzle, comprising a solid grain of self-combustible propellant, a thermoplastic liner surrounding one end and the sidewalls of said grain, a metal plate having one flat surface the other surface of the metal plate being curved to conform with the forward end of the rocket motor chamber, said curved surface being provided with a centrally threaded stud projecting a substantial distance beyond the surface of said plate, tape strips passing over the surface of said metal plate and extending a substantial distance along the sides of said propellant grain, said extending ends being wound spirally over the coated sides of the grain, and a second liner impregnating and embedding the tape wrappings.

6. A solid propellant charge adapted to be fastened within the combustion chamber of a rocket motor, said charge comprising a solid stick of self-combustible propellant, one end of the stick having fastened to it a rigid plate and the other end of the stick being left uncovered to provide a burning surface thereon, a liner adherent to the circumferential wall of the stick and being of a material of slower burning properties than the material of the stick, and means for securing the stick to the plate, said means comprising tape strips passing over the plate and having their ends extending a substantial distance along opposite sides of the stick, and a liner over said ends of the tape strips and closely adherent to the strips and to the first-mentioned liner whereby the stick is protected against pulling away from the plate or disintegrating while burning.

7. A solid propellant charge according to claim 6 in which a fastening device is attached to said plate for fastening it to the chamber of the rocket motor.

8. A solid propellant charge adapted to be fastened within the combustion chamber of a rocket motor, said charge comprising a solid stick of self-combustible propellant, one end of the stick having placed against it a rigid plate, said plate being provided with attaching means for attaching the plate to the motor chamber, and the other end of the stick providing a burning surface, and means for securing the stick to the plate, said means comprising a plurality of tape strips passing over the plate and having their ends extending a substantial distance along opposite sides of the stick, said tape ends being interleaved with each other, and a layer of liner material over said ends of the tape strips and closely adherent to the strips and binding the strips to the sides of the propellant stick, said liner material being of slower burning properties than the material of the stick.

9. A solid propellant charge adapted to be fastened within a cylindrical-shaped chamber of a rocket motor, said charge comprising a cylindrical-shaped stick having circular ends, the stick being of a self-combustible propellant, one end of the stick having placed over it a rigid plate and the other end of the stick being left uncovered to provide a burning surface, a liner adherent to the cylindrical side of the stick and being of a material of slower burning properties than the material of the stick, a plurality of tapes for binding the stick to the plate, said tapes passing over the plate and having their ends extending a substantial distance along opposite sides of the stick, the several tape ends being interwoven with each other while leaving spaces which expose the liner beneath them, and a second liner over said tape ends, said second liner impregnating and embedding the strips and adhering to the first-mentioned liner, whereby the stick is protected against pulling away from the plate or disintegrating while burning.

10. A solid propellant according to claim 9 in which both of said liners are of thermoplastic material.

RICHARD D. GECKLER.

REFERENCES CITED

The following references are of record in the file of this patent:

UNITED STATES PATENTS

| Number | Name | Date |
|---|---|---|
| 34,058 | Hotchkiss | Jan. 7, 1862 |
| 503,096 | Mohr | Aug. 8, 1893 |
| 892,757 | Mosier | July 7, 1908 |

FOREIGN PATENTS

| Number | Country | Date |
|---|---|---|
| 5,259 | Great Britain | Mar. 3, 1906 |